United States Patent [19]

Fickelscher

[11] Patent Number: 5,061,227
[45] Date of Patent: Oct. 29, 1991

[54] BEARING SYSTEM FOR WAVE GENERATOR DRIVE

[75] Inventor: Kurt Fickelscher, Frankenthal, Fed. Rep. of Germany

[73] Assignee: Renk Aktiengesellschaft, Augsburg, Fed. Rep. of Germany

[21] Appl. No.: 435,696

[22] Filed: Nov. 13, 1989

[51] Int. Cl.⁵ .............................................. F16H 15/50
[52] U.S. Cl. ...................................... 475/170; 475/166
[58] Field of Search .................. 475/162, 165, 166, 170

[56] References Cited

U.S. PATENT DOCUMENTS

| Re. 25,579 | 5/1964 | Sacchi | 475/166 |
| 787,080 | 4/1905 | Conant | 475/170 |
| 2,666,345 | 1/1954 | Amberg | 475/165 |
| 4,003,272 | 1/1977 | Volkov | 74/640 |
| 4,112,787 | 9/1978 | Tippman et al. | 475/165 |
| 4,580,957 | 4/1986 | Fickelscher | 418/57 |

FOREIGN PATENT DOCUMENTS

| 1191650 | 4/1965 | Fed. Rep. of Germany | 475/166 |
| 3738521 | 11/1987 | Fed. Rep. of Germany | |
| 329811 | 5/1930 | United Kingdom | 475/170 |

OTHER PUBLICATIONS

*The Harmonic Drive, Machine Design*, Apr. 14, 1960 pp. 160–713.

Primary Examiner—Allan D. Herrmann
Assistant Examiner—Ryan W. Massey
Attorney, Agent, or Firm—Natter & Natter

[57] ABSTRACT

A bearing system for a wave generator includes at least two laterally positioned rolling discs each of which is supported eccentrically through an eccentric ring and an intermediate bearing. The eccentric rings are frictionally clamped to each other with one of the rings being adjustable relative to the other to provide eccentricity. The exterior faces of the discs roll against a flexible ring. Axial movement of the flexible ring relative to the rolling discs is precluded through the use of collars or clips which radially project from the rolling discs. The axial end faces of the flexible ring sealingly engage the interior faces of the collars.

17 Claims, 4 Drawing Sheets

BEARING SYSTEM FOR WAVE GENERATOR DRIVE

FIELD OF THE INVENTION

This invention relates generally to harmonic drive systems and more particularly to an improved wave generator bearing arrangement.

BACKGROUND OF THE INVENTION

In U.S. Pat. No. 4,580,957 a bearing arrangement for a wave generator capable of eccentrically deflecting a flexible ring of a rotary piston engine was disclosed. The bearing arrangement included a pair of rolling discs arranged side by side and supported on a drive shaft through eccentrics which were pivotable against each other. A flexible ring was engaged by the radially external face of each of the rolling discs. The flexible ring constituted the engine piston ring and was forced against the inner face of a cylinder wall. The piston ring was flexed or deflected through rolling contact between its inner face and the external faces of the rolling discs.

Among the problems encountered with such arrangement was the fact that the flexible piston ring accumulated foreign matter including combustion byproducts on its inner face. Such accumulations were in some instances due to engine ventilation.

Further, when a comparatively soft material was utilized for the flexible piston ring, such as austintite, the flexible piston ring deformed, i.e. became wavy, in the rolling contact area between the external faces of the rolling discs and the inner face of the flexible piston ring. The deformation was primarily due to flexing in the exhaust suction direction. In view of the requirements for sealing the cylinder and piston ring in the engine, piston ring deformations were undesirable.

In addition, the disclosed bearing arrangement presented difficulties in connection with the balancing of the comparatively large revolving masses. Balancing requirements presented increased manufacturing costs.

Another wave generator bearing arrangement has been disclosed in U.S Pat. No. 4,003,272 in conjunction with a harmonic drive planetary gear. The invention therein disclosed included three identical rolling discs positioned side by side. The radially external faces of the discs contacted the inner face of a flexible splined planet wheel.

To support the rolling discs, identical roller bearings were provided between each rolling disc and interiorly positioned eccentric rings, also arranged side by side. The bearing assembly was relatively long in an axial direction and was thus not practical in applications with limited space requirements. Further, as a result of an endless bearing ring which extended over the same axial length as the flexible planet wheel, relatively large radial forces and concomitant bearing loads were generated.

In addition, since the radial force exerted on the central rolling disc was twice that exerted on each of the lateral rolling discs, the central bearing received twice the load than the bearings which supported the lateral rolling discs. As a result, the useful life of the wave generator was determined by that of the central bearing.

Also, because the three rolling bearings were of identical construction, assembly of the bearing system required a three part design of the driving eccentric. In addition, relatively high system imbalance resulted due to the fact that eccentric rings, rolling bearings and rolling discs of identical design were employed. Such system imbalanced resulted in additional balancing expenses and relatively high manufacturing costs.

SUMMARY OF THE INVENTION

A bearing system for wave generators includes at least two rolling discs which are positioned side by side with each disc being supported eccentrically through a radially interior bearing and an eccentric ring. The eccentric rings are adjustably frictionally joined to one another.

A flexible ring is engaged by the radially external faces of the discs and is restrained against axial movement by a pair of collars or circular clips which project radially from the rolling discs adjacent the two outer sides. The axial end surfaces of the flexible ring sealingly seat against the interior sides of the collars or circular clips.

Relative eccentric axial adjustment between the eccentric rings results in radial displacement of the corresponding rolling discs which are carried by their associated bearings.

In instances where three rolling discs are provided, the central disc and its support bearing and eccentric ring are significantly larger in axial length than the laterally positioned rolling discs, associated bearings and eccentric rings. Such structure compensates for the fact that the radial load on the central rolling disc is greater than the radial load on each of the lateral rolling discs and also simplifies system balancing.

In order to reduce radial load on the wave generator bearing system, the flexible ring body may optionally include an axial slit.

From the foregoing compendium, it will be appreciated that it is an aspect of the present invention to provide a bearing system for a wave generator of the general character described which is not subject to the disadvantages of the background art aforementioned.

A consideration of the present invention is to provide a bearing system for a wave generator of the general character described which is relatively low in cost and simple in design.

A feature of the present invention is to provide a bearing system for a wave generator of the general character described which provides both a highly compacted narrow profile in an axial direction and a relatively high load capacity.

Another feature of the present invention is to provide a bearing system for a wave generator of the general character described with enhanced operational safety and relatively long useful life.

To provide a bearing system for a wave generator of the general character described for eccentrically flexing a flexible ring by rolling off the interior face of the flexible ring while sealing such interior face against foreign matter and other contaminants is another feature of the present invention.

A further consideration of the present invention is to provide a bearing system for a wave generator of the general character described which can be assembled with conventional commercially available bearings.

A still further feature of the present invention is to provide a bearing system for a wave generator of the general character described wherein the relative radial displacement of eccentric rings may be easily adjusted and set.

Yet a further aspect of the present invention is to provide a bearing system for a wave generator of the general character described which may be equally employed with a flexible ring body functioning as a piston ring for a thin walled rotary piston, a bearing wheel or a splined planet wheel.

To provide a bearing system for a wave generator of the general character described which may be readily employed at relatively high speeds and heavy loads while accomplishing both size and weight reductions is a further consideration of the present invention.

Another consideration of the present invention is to provide a bearing system for a wave generator of the general character described which may be produced utilizing low waste manufacturing techniques.

An additional feature of the present invention is to provide a bearing system for a wave generator of the general character described which facilitates low cost manufacturing through the utilization of relatively inexpensive materials and without requiring use of a hardened flexible ring.

A further consideration of the present invention is to provide a wave generator of the general character described with reduced radial restoring forces.

An additional consideration of the present invention is to provide a bearing system for a wave generator of the general character described which is equally well adapted in both high and low speed operations for utilization of conventional self-lubricating sliding bearings as well as rolling bearings.

Other aspects, features and considerations of the present invention in part will be obvious and in part will be pointed out hereinafter.

With these ends in view, the invention finds embodiment in the various combinations of elements and arrangements of parts by which the said aspects, features and considerations and certain other aspects, features and considerations are attained, all with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention.

DESCRIPTION OF THE PREFERRED EMBODIMENT

Figure 1:
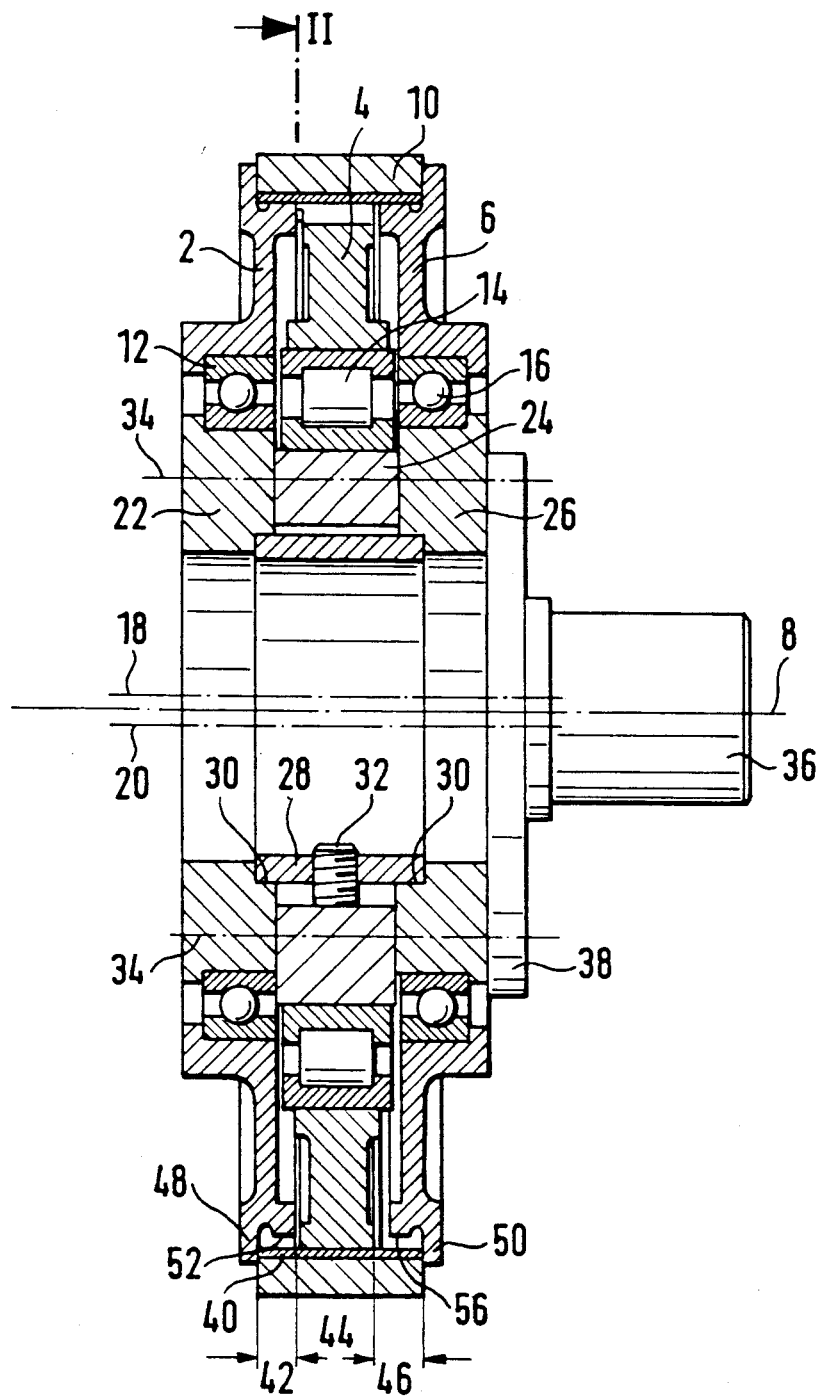
FIG. 1 is a longitudinal sectional view of a wave generator including a bearing system constructed in accordance with and embodying the invention and showing a bearing arrangement well suited for utilization in high load environments and having a pair of lateral rolling discs positioned on opposite sides of a central rolling disc with the external faces of the discs engaging a flexible ring seated between radial collars projecting from the lateral disc faces adjacent the outer side of each disc.

Referring now in detail to the drawings, wherein like numerals are employed to denote like components of the various embodiments of the invention, FIG. 1 illustrates a wave generator having a bearing system constructed in accordance with and embodying the invention. The bearing system includes a pair of lateral outer rolling annular discs 2, 6 between which a central annular rolling disc 4 is positioned. The discs 2, 4, 6 are arranged side by side in a axial direction.

In accordance with the invention, the discs 2, 4, 6 are offset radially from a system rotational axis denoted by the reference numeral 8 and serve the function of dynamically deforming a flexible ring 10 from an unstressed circular configuration.

The two lateral rolling discs, 2, 6 are of identical construction and are assembled facing one another with the central rolling disc 4 intermediately positioned. The lateral rolling discs, 2, 6 are each supported on an eccentric ring, 22, 26, respectively, with a conventional bearing such as a ball bearing assembly 12, 16, respectively, mounted between the eccentric rings 22, 26 and the respective rolling discs 2, 6. It should be noted that the bearings 12, 16 rotate about a bearing axis 18 which is eccentric to the longitudinal axis 8.

The central rolling disc 4 is rotatably mounted about a central eccentric ring 24 through a conventional bearing 14, typically illustrated as a cylindrical roller bearing. The roller bearing 14 rotates about an axis 20 which is arranged eccentric to the longitudinal axis 8 in an opposite direction than the axis 18 of the bearings 12, 16.

Pursuant to the invention, the eccentric rings 22, 26 are centered with respect to one another through an inner support sleeve 28, the ends of which are seated in a circumferential groove 30 formed on the interior side of each lateral eccentric ring, 22, 26.

In order to adjust for the eccentricity of the wave generator, an adjusting screw 32 is threadingly received within a bore of the support sleeve 28 along a radial axis.

Through bolts or screws may be employed for connecting the eccentric rings 22, 26 for unitary rotation and for frictionally securing the central eccentric ring 24 between the interior faces of the lateral eccentric rings 22, 26 and maintaining the eccentric adjustment set by the adjusting screw 32.

In FIG. 1, the dot and dash lines designated by the numeral 34 represent the axes for such screws.

Figure 2:
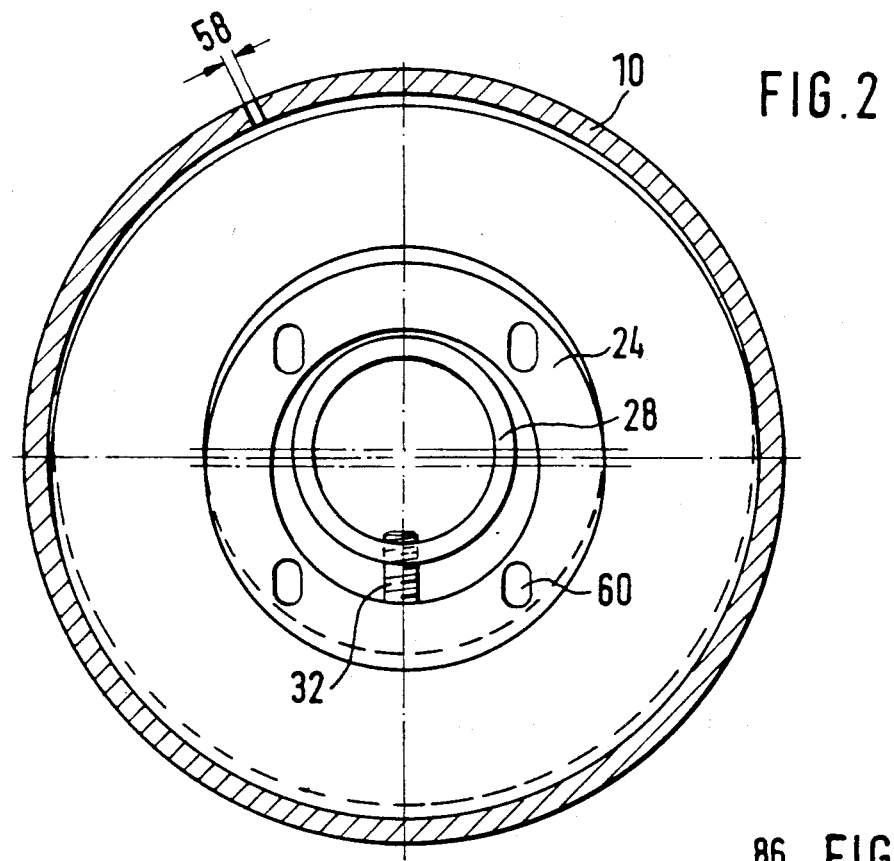
FIG. 2 is a sectional view through the wave generator, the same being taken substantially along the line II—II of FIG. 1, with portions deleted for clarity and showing a flexible ring having an axially slit body.

Threaded apertures may be provided along such axis through the rings 22 and 26 or, the ring 26 may include an oversize bore or slot 60 along such axes. In addition, an oversize bore 60 is provided along these axes through the central eccentric ring 24 as illustrated in FIG. 2.

In order to adjust the double eccentricity of the wave generator bearing system, the through bolts extending along the axes 34 are loosened and the adjusting screw is then rotated to set the distance between the bearing axes 18 and 20. After precise adjustment is made by rotation of the screw 32, the through bolts are tightened, frictionally clamping the central eccentric ring 24 between the lateral eccentric rings 22, 26. As a result, a high degree of safety in operation is ensured.

In the event excessive forces are encountered, additional support for the eccentric positioning of the wave generator is provided through the adjusting screw as well as through the support sleeve 28 secured between the eccentric rings 22, 26.

The wave generator may be coupled to an input drive shaft 36 by the through bolts which are employed to frictionally clamp the central eccentric ring 24. The through bolts pass through suitable apertures formed along the axes 34 in a perpendicular flange 38 fixed to the end of the input shaft 36.

To obtain overload protection, the screw 32 can be removed after the axes 18 and 20 have been set relative to the axis 8 and the torque applied to the through bolts which clamp the eccentric rings 22, 24, 26 and the drive shaft flange 38 may be preset such that upon exceeding a specified load, the frictional engagement retaining the central eccentric ring 24 is overcome and radial movement of the eccentric rings relative to one another takes place. As a result, fracture or failure of the wave generator components is avoided.

It should also be noted that the central roller bearing 14 is required to carry a load which is essentially the equivalent of the sum of the load carrying capacities of the two bearings 12, 16 which carry the lateral rolling discs, 2, 6, respectively. As a result, smaller conventional bearings may be selected as the bearings 12, 16 than for the bearing 14 thereby achieving a reduction in axial length of the bearing system and a reduction in the total weight of the wave generator. In addition, the masses of the various mutually eccentric parts are matched for the purpose of avoiding system imbalance. For example, the mass of each lateral rolling disc 2, 6 is approximately one-half the mass of the central rolling disc 4.

Pursuant to the invention, the flexible ring 10 may be formed of a conventional metal or other material without the requirement for surface hardening or heat treatment. Preferably, high surface strength is achieved through the utilization of a precision spring steel strip 40 against which the rolling discs 2, 4, 6 roll.

The central rolling disc 4 includes a radially external face 54 having a width designated by the double arrow 44 in FIG. 1. Such width 44 is essentially equal to the sum of the corresponding widths, designated by the arrows 42, 46 of the external faces 52, 56 of the lateral rolling discs 2, 6. As a result, uniform load and material utilization is provided.

In accordance with the invention, the flexible ring 10 is restrained from axial movement through the utilization of collars, 48, 50 which project radially from the sides of the rolling discs, 2, 6 beyond their radially external faces 52, 56. Alternately, circular clips may be employed in lieu of integral collars 48, 50.

The axial gap or space between the collars 48, 50 and the axial end surfaces of the flexible ring 10 is adjusted relatively tightly to provide a seal which prevents the entrance of contaminants but may possibly permit excess grease or other lubricant to be expelled.

It should be noted that the relative movement between the end surfaces of the flexible band 10 and the rolling disc collars 48, 50 is relatively small. The movement of a point of the end face of the flexible ring 10 relative to the face of an associated collar 48, 50 approximately corresponds to an evolute. The relative movements are comparable to overlapping movements with excess pressure and excessive wear being reliably avoided.

In FIG. 2, the wave generator and bearing system is illustrated with the rolling bearings 14 and the spring steel strip 40 omitted for the purpose of better illustrating the remaining components. The flexible ring 10 is shown to include an axial slit 58 which serves to reduce radial restoring forces. For example, with an axial flexible ring 10 having width of 20 mm., an outside diameter of 100 mm. and an inside diameter of 94 mm., a restoring force of 16 kg. is obtained with an ovalization of 2 mm. when the flexible ring includes the slit 58. The corresponding restoring force of an identically dimensioned flexible ring 10 without the slit 58 is approximately 130 kg.

Figure 3:
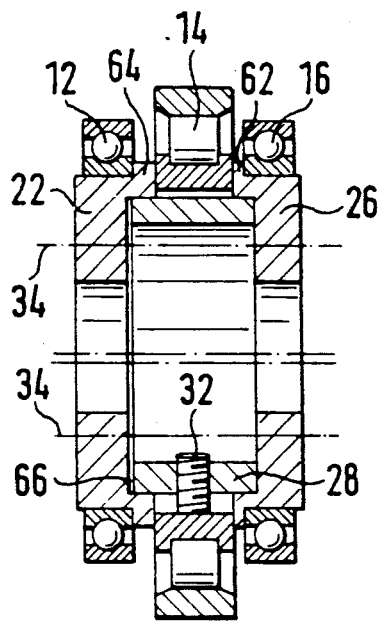
FIG. 3 is a longitudinal sectional view through an alternate embodiment of the invention which utilizes a reduced number of components and with portions deleted for clarity.

Turning now to FIG. 3 which shows an alternate embodiment of the invention, depicted, for the purposes of simplification only, without illustrating a plurality of rolling discs 2, 4, 6 and a drive shaft. The embodiment illustrated in FIG. 3 is particularly well adapted for high speed operation and does not include a central eccentric ring 24 positioned between a pair of lateral eccentric rings 22, 26. In lieu of a central eccentric ring 24, an inner race 62 of a central bearing 14 is clamped directly between a pair of lateral eccentric rings, 22, 26. The engagement surfaces of the eccentric rings 22, 26 and the bearing race 62 is enlarged at the eccentric rings 22, 26 by radial collars 64 on the eccentric rings. The collars 64 also serve as a lateral seat for the outer races of the lateral bearings 12, 16. An adjusting screw 32 is engaged in a central support sleeve 28 and bears directly against the inner race of the central bearing 14.

A gap 66 is presented between the support sleeve 28 and the lateral eccentric ring 22 for the purpose of permitting the frictional clamping of the support sleeve 28 between the two lateral eccentric rings 22, 26.

Figure 4:
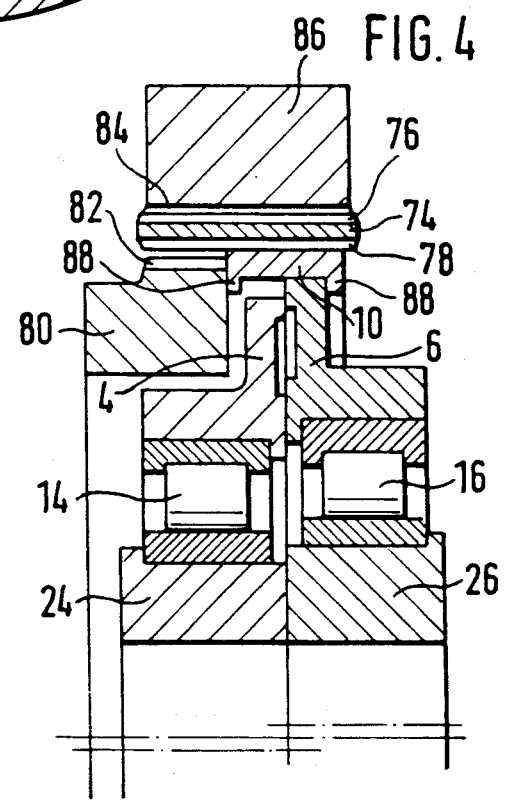
FIG. 4 is a fragmentary enlarged scale longitudinal sectional view through a further embodiment of the invention and illustrating a wave generator bearing system with two rolling discs in engagement with a flexible splined planet wheel of a planetary gear.

In FIG. 4, a further embodiment of the invention is illustrated wherein the bearing system is used in conjunction with a wave generator for a planetary gear having a flexible splined planet wheel 74. The planet wheel 74 includes external teeth 76 and internal teeth 78. Planetary gears of this type have been disclosed in German patent document DE-PS 37 38 521.

The planetary gear includes a sun gear 80 having external teeth 82 which are engageable in the set of internal teeth 78 of the flexible splined planet wheel 74.

As illustrated in FIG. 4, the external teeth 76 of the flexible planet wheel 74 are capable of engaging internal teeth 84 of a ring gear 86. The sets of teeth 82 and 84 have different numbers of teeth.

The wave generator is actuatable to urge the flexible splined planet wheel 74 in a radial direction into the tooth gaps of the respective gears, i.e. the teeth 76 into the gaps between the teeth 84 and the teeth 78 into the gaps between the teeth 82 in predetermined engagement zones.

Four engagement zones are distributed over the circumference of the planetary gear. In two of the engagement zones, the flexible planet wheel 74 meshes with the ring gear 86 and, in the other two engagement zones, offset by 90 degrees, the planet wheel 74 meshes with the sun wheel 80.

The wave generator bearing system depicted in FIG. 4 includes a pair of rolling discs 4, 6 each of which is supported by an associated conventional rolling bearing 14, 16 which, in turn, is mounted to an eccentric ring 24, 26, respectively. The radially external faces of the rolling discs 4, 6 roll off the inner face of a flexible ring 10.

In lieu of employing radially projecting collars on the external faces of the discs 4, 6, the axial ends of the flexible ring 10 include radially inwardly projecting collars 88 for preventing axial movement of the flexible band 10. The flexible band 10 may include an optional axial slit and is deformed by the bearing system of the wave generator. As previously mentioned, conventional roller bearings 14, 16 are employed; deformable rolling bearings are not required.

The flexible ring 10, which forms the outer ring of the bearing system of the invention, is arranged directly next to the sun wheel 80 and the widths of the rolling discs 4, 6 are substantially narrower in the region of the engagement of their faces with the flexible band then in the region of their respective bearings 14, 16.

The double eccentric offset of the bearing system is formed, as with the prior embodiments, by the two radially offset eccentric rings 24, 26 which are screwed to each other. For securely mounting the rolling bearings 14, 16, in the bearing assembly, internal shoulders are provided on the discs 4, 6 and external shoulders are provided on the eccentric rings 24, 26.

The bearing system of the wave generator presents a complete transmission in an extremely compact configuration.

Figure 5:
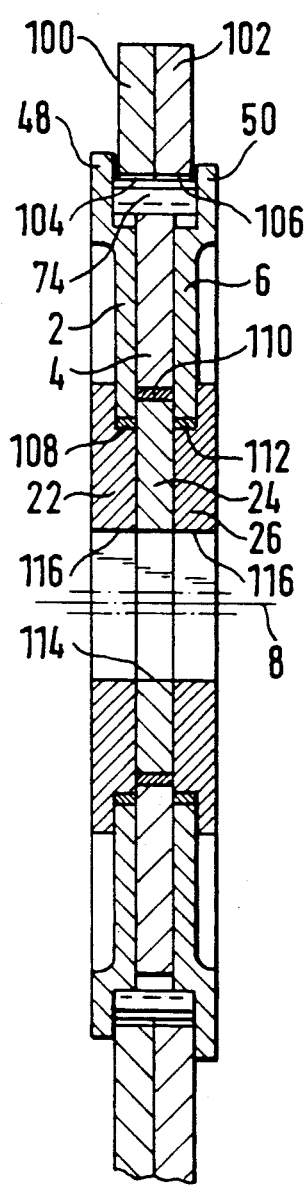
FIG. 5 is a longitudinal sectional view through another embodiment of the invention illustrating a wave generator bearing system suitable for a seat adjustment drive mechanism and having three rolling discs and sliding bearings rather than rolling bearings.
Figure 6:
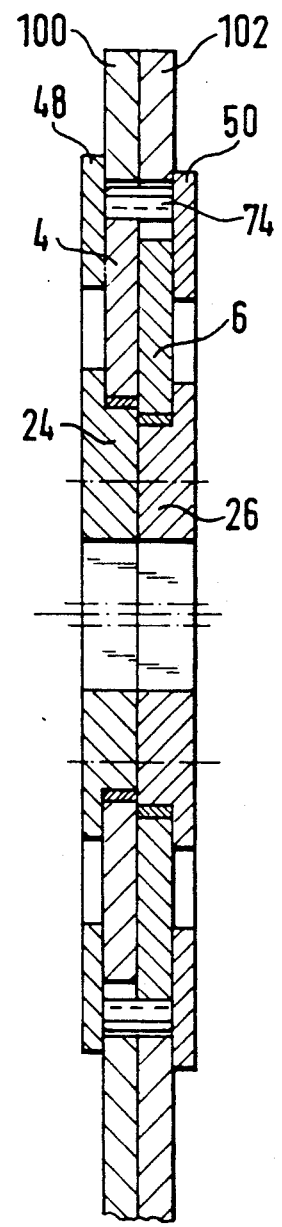
FIG. 6 is a longitudinal sectional view through a still further embodiment of the invention, similar to that of the embodiment of FIG. 5 wherein, however, two rather than three rolling discs are employed.
Figure 7:
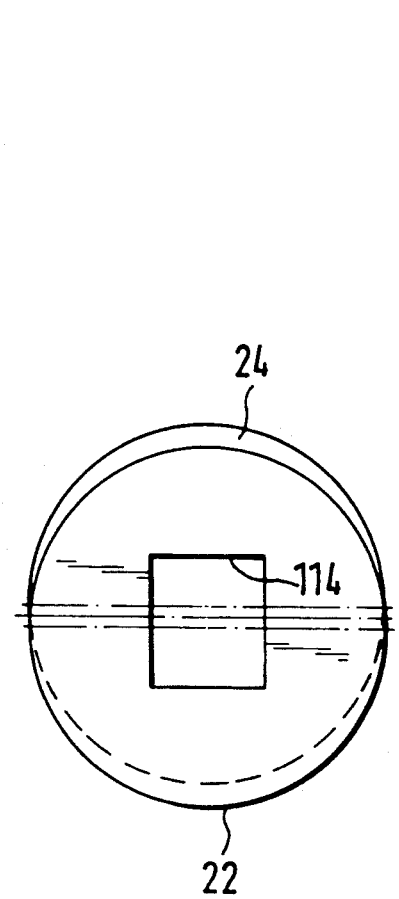
FIG. 7 is a side view of the embodiment illustrated in FIG. 5 with portions deleted and showing a square axial keyway for driving the wave generator.

The embodiments of the invention depicted in FIG. 5, FIG. 6 and FIG. 7 find particular utility in conjunction with manually operable adjusting drives, such as motor vehicle seat adjustment mechanisms for the adjustment of seat height and/or back rests.

In the embodiment illustrated in FIGS. 5 and 7, a bearing system which includes two ring gears, 100, 102 is illustrated. Each of the ring gears 100, 102 includes internal teeth 104, 106, respectively, with the number of teeth 104 of the ring gear 100 being different than the number of teeth 106 in the ring gear 102.

One of the ring gears, for example, the ring gear 100 is connected with an automotive seat frame or chassis of the motor vehicle while the other ring gear 102 may be connected with an adjustable back rest or seat bottom. The ring gears 100, 102 including their internal teeth 104, 106 are preferably formed by stamping.

The bearing system as illustrated in FIG. 5 includes a flexible splined planet wheel 74 having both external and internal teeth. The flexible splined planet wheel 74 is supported on three rolling discs, 2, 4, 6. The lateral rolling discs, 2 and 4 each have a lateral collar 48, 50, respectively, for restraining axial movement of the flexible splined planet wheel 74 and the ring gears 100, 102. The collars 48, 50 have an outer diameter which is considerably larger than the dedendum circle of the internal teeth 104, 106 of the ring gears 100, 102, respectively and thus provide axial support for the ring gears 100, 102. This is of particular significance in motor vehicle applications. As a result, the bearing system of the embodiment illustrated in FIG. 5 provides a sturdy operating adjustment drive with relatively few parts, little material and low manufacturing costs.

It should be noted that the rolling discs 2, 4, 6 of this embodiment are each supported on a corresponding eccentric ring 22, 24, 26, respectively by a self-lubricating solid bearing 108, 110, 112, respectively.

To promote low cost fabrication with minimum material waste, the eccentric rings 22, 24, 26 may be produced from the cores of the stamped ring gears 100, 102. In addition, the rolling disc 4 may also be stamped from the punched out core of one of the ring gears. Accordingly, waste in manufacture is minimized and the adjusting drive can be produced at relatively low cost.

In order to secure the rolling discs 2, 4, 6 and their associated bearings 108, 110, 112, the two lateral eccentric rings, 22, 26 include collars extending radially outwardly adjacent their external faces.

It should also be noted that the adjusting drive is relatively compact in an axial length and requires little material, resulting in weight savings which is particularly advantageous in automotive applications.

In order to drive the ring gears 100, 102, each of the eccentric rings 22, 24, 26 has a central opening 114, 116 which is in the form of a square. A square shaft having an adjusting wheel for manual adjustment is mounted through the openings 114, 116.

The adjusting drive of this embodiment is highly reliable under shock loads which act, for example, through the seat back rest and the ring gear 102.

It should also be noted that the flexible splined planet wheel 74 has four engagement zones distributed over its circumference. Under load, forces are transmitted not only in the four engagement zones, but also through the tooth tips of the flexible splined planet wheel outside the engagement zones that is by abutting contact of tooth heads which is encountered in four support zones. The support zones are positioned between the four engagement zones. As a result, the adjustment drive provides a high degree of shock resistance and safety which is especially desirable in motor vehicle applications and which is accomplished within relatively small dimensional bounds.

FIG. 6 shows a further embodiment of the invention in conjunction with adjusting drives. The FIG. 6 embodiment is similar to that of FIG. 5, however, there is no central rolling disc and central eccentric ring. The adjusting drive includes two rolling discs 4, 6 and two eccentric rings 24, 26, respectively. Between the rolling discs 4, 6 and the eccentric rings 24, 26 self-lubricating solid bearings are positioned. In a manner similar to that of the embodiment of FIG. 5, the eccentric rings 24, 26 have radially outwardly projecting collars for securing the rolling discs 4, 6 in an axial direction.

Also in a manner similar to that of the FIG. 5 embodiment, the rolling discs 4, 6, include collars or clips 48, 50 for axially securing both the flexible splined planet gear 74 and a pair of ring gears 100, 102 having internal teeth.

To assemble the adjusting drives of the FIG. 6 embodiment, the eccentric rings 22, 24 are directly connected as, for example, by screws, rivets or spot welding. In addition, the central eccentric ring 24 of the FIG. 5 embodiment may be similarly directly secured.

As with the rolling disc 4 of the embodiment of FIG. 5, in the FIG. 6 embodiment, the rolling discs 4, 6 may be made from the scrap cores remaining after stamping the ring gears 100, 102. Thus, the adjusting drives of the present invention are particularly well suited for economical mass production fabrication with a minimum of scrap.

Figure 8:
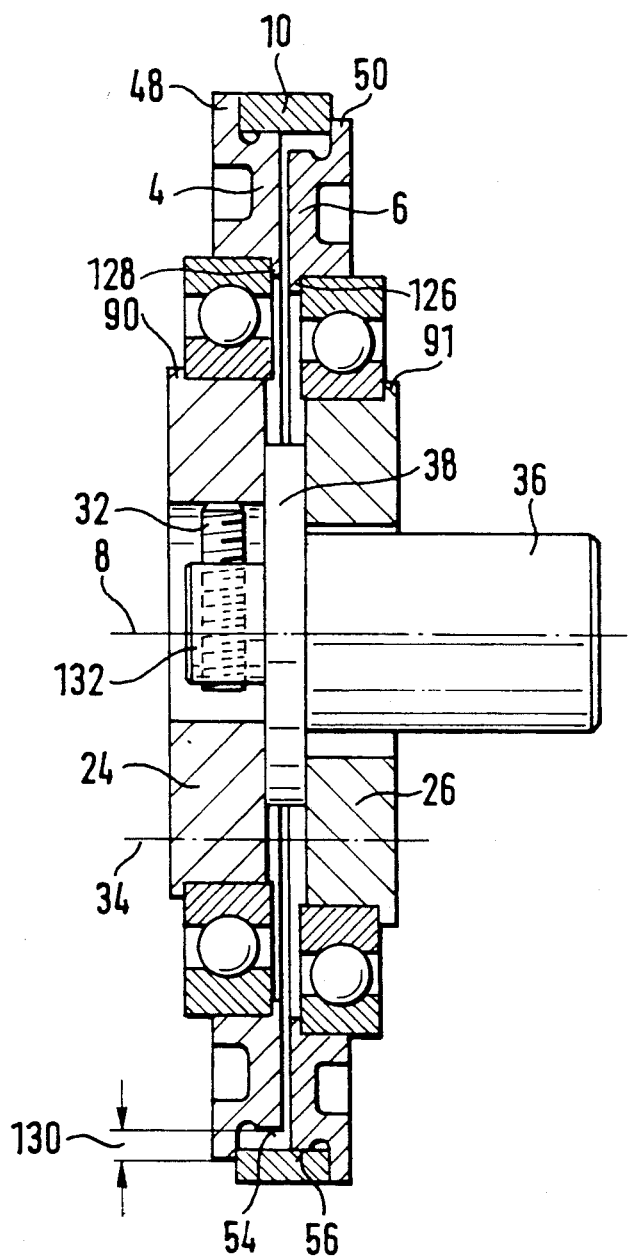
FIG. 8 a longitudinal sectional view through a still further embodiment of the invention wherein a narrow axial profile is presented and two rolling discs are employed for engaging a flexible ring body.

A further embodiment of the invention is illustrated in FIG. 8 wherein two rolling discs 4, 6, engage a flexible ring 10. The rolling discs 4, 6 each include a radially inwardly projecting collar 128, 126, respectively which extend from opposed internal faces of the discs. Projecting from the lateral faces of the rolling discs 4, 6, in a radially outward direction are collars or clips 48, 50, respectively, which secure the flexible ring 10 against axial movement.

A drive shaft 36 having a rotation axis 8 is shown in engagement with the bearing system. The drive shaft 36 includes a perpendicular end flange 38 which is positioned between a pair of eccentric support rings 24, 26. The eccentric support rings 24, 26 may be clamped together by through bolts or other means along screw axes 34 illustrated in dot and dash lines. The clamping engagement serves to frictionally retain the drive shaft flange 38 for driving engagement.

The eccentric rings 24, 26 each include a radially outwardly projecting collar 90, 91, respectively, which extend adjacent their outer faces. Roller bearings which support the discs 4, 6 are engaged between the eccentric ring external collars 90, 91 and internal collars 128, 126, of the rolling discs 4, 6. The collars 90, 91 serve to fix the inner races of the bearings while the outer bearing races in engagement with the collars, 128, 126 axially fix the rolling discs 4, 6.

It should be appreciated that the rolling discs 4, 6, their bearings and the eccentric rings 24, 26 as well as the flexible ring 10 present substantially the same axial width while providing reliable and sturdy support and thus, a sturdy and dependable wave generator.

It is significant that in all embodiments employing two rolling discs, the height, depicted in FIG. 8 by the numeral 130, of the collars or clips 48, 50 in a radial direction, is greater than the eccentricity or the maximum radial distance between the external faces 54, 56 of the rolling discs 4, 6. This is to assure that the flexible ring 10 will always be restrained against axial movement by the collars 48, 50.

In the embodiments wherein three rolling discs are employed, the height of the collars 48, 50 in a radial direction must be greater than the eccentricity or the maximum radial distance between the external face 54 of the central rolling disc and the external faces 52, 56 of the lateral rolling discs.

Referring again to the embodiment of FIG. 8, it should also be noted that the drive shaft 36 includes a trunnion 132 which extends into a bore of the eccentric support ring 24. An adjusting screw 32 is threaded transversely through the trunnion 132 and bears against the eccentric ring 24 for the purpose of adjusting eccentricity in accordance with the invention. After adjustment of the screw 32, the eccentric support rings 24, 26 are tightened together.

Thus it will be seen that there is provided a bearing system for a wave generator drive which achieves the various aspects, features and considerations of the present invention and which is well suited to meet the conditions and practical usage.

Since various possible embodiments might be made of the present invention and various changes might be made in the exemplary embodiments set forth herein, it is to be understood that all matters described herein or shown in the accompanying drawings should be interpreted as illustrative and not in a limiting sense.

Having thus described the invention, there is claimed as new and desired to be secured by Letters Patent:

1. A bearing system for a wave generator, the bearing system having at least two rolling discs arranged axially side by side, an eccentric ring associated with each rolling disc, means for selectively frictionally coupling the eccentric rings, bearing means interconnecting each rolling disc and its associated eccentric ring, means for radially adjusting one eccentric ring relative to at least one other eccentric ring when the means selectively frictionally coupling the eccentric rings is released and a flexible ring, each rolling disc having a radially exterior face, the exterior faces of the rolling discs applying deformation forces against the flexible ring, the flexible ring including a slit extending over its axial length, means for preventing relative axial movement between the flexible ring and the rolling discs, the preventing means comprising axially spaced retention means projecting radially between the rolling discs and the flexible ring.

2. A planetary gear arrangement driven by a wave generator having a bearing system constructed in accordance with claim 1, the planetary gear including a ring gear having internal teeth, a sun gear having external teeth and a flexible splined planet wheel, the flexible splined planet wheel having a set of internal teeth for selective engagement with the sun gear and a set of external teeth for selective engagement with the ring gear, the wave generator deforming the flexible splined planet wheel into simultaneous engagement with both the sun gear and the ring gear at defined engagement zones.

3. A planetary gear as constructed in accordance with claim 2 wherein the sun gear is positioned axially adjacent one of the rolling discs.

4. A bearing system for a wave generator as constructed in accordance with claim 2 wherein the retention means projects radially from the flexible ring, the flexible ring engaging the flexible splined planet wheel.

5. A bearing system for a wave generator, the bearing system having at least two rolling discs arranged axially side by side, an eccentric ring associated with each rolling disc, means for selectively frictionally coupling the eccentric rings, bearing means interconnecting each rolling disc and its associated eccentric ring, means for radially adjusting one eccentric ring relative to at least one other eccentric ring when the means selectively frictionally coupling the eccentric rings is released and a flexible ring, each rolling disc having a radially exterior face, the exterior faces of the rolling discs applying deformation forces against the flexible ring, means for preventing relative axial movement between the flexible ring and the rolling discs, the preventing means comprising axially spaced retention means projecting radially from the rolling discs, the flexible ring having axial end faces in sealing engagement with the retention means.

6. A bearing system for a wave generator as constructed in accordance with claim 5 further including a central rolling disc, the two rolling discs being positioned laterally of the central rolling disc, means for concentrically mounting the eccentric rings associated with the two lateral rolling discs, the mounting means comprising a cylindrical sleeve, bearing means for rotatably mounting the central rolling disc and means frictionally clamping the bearing means for rotatably mounting the central rolling disc between the two lateral eccentric rings.

7. A bearing system for a wave generator as constructed in accordance with claim 5 wherein the flexible ring comprises a splined planet gear, the planet gear having external teeth, a pair of ring gears positioned side by side, each of the ring gears having a set of internal teeth, the number of teeth in each set being different, the external teeth of the flexible splined planet gear being in engagement with the teeth of the ring gear in four evenly spaced engagement zones simultaneously.

8. A bearing system for a wave generator as constructed in accordance with claim 7 wherein the eccentric rings include means forming a keyed axial opening, the axial opening nonrotatably accommodating a mating drive shaft.

9. A bearing system for a wave generator as constructed in accordance with claim 7 further including a central rolling disc, the two rolling discs being positioned laterally of the central rolling disc, an eccentric ring associated with the central rolling disc, bearing means interconnecting the central rolling disc and its associated eccentric ring, the means for coupling the eccentric rings including means nonrotatably joining the eccentric rings.

10. A bearing system for a wave generator as constructed in accordance with claim 7 wherein the eccentric rings include means for preventing axial displacement of the rolling discs, the preventing means including axially spaced radially projecting ring collars, the rolling discs being positioned between the ring collars.

11. A bearing system for a wave generator as constructed in accordance with claim 5 further including a central rolling disc, the two rolling discs being positioned laterally of the central rolling disc, an eccentric ring associated with the central rolling disc, bearing means interconnecting the central rolling disc and the associated eccentric ring, the means for coupling the eccentric rings including means nonrotatably joining the eccentric rings.

12. A bearing system for a wave generator, the bearing system having at least two rolling discs arranged axially side by side, an eccentric ring associated with each rolling disc, means for selectively frictionally coupling the eccentric rings, bearing means interconnecting each rolling disc and its associated eccentric ring, means for radially adjusting one eccentric ring relative to at least one other eccentric ring when the means selectively frictionally coupling the eccentric rings is released and a flexible ring, each rolling disc having a radially exterior face, the exterior faces of the rolling discs applying deformation forces against the flexible ring, means for preventing relative axial movement between the flexible ring and the rolling discs, the preventing means comprising axially spaced retention means projecting radially between the rolling discs and the flexible ring, a central rolling disc, the two rolling discs being positioned laterally of the central rolling disc, means for concentrically mounting the eccentric rings interconnected to the lateral rolling discs, the mounting means comprising a cylindrical sleeve, each of the lateral eccentric rings including an annular shoulder, the sleeve being seated in one of the annular shoulders at each of its ends, the central rolling disc including a radially exterior face, the axial width of the radially exterior face of the central rolling disc being substantially the sum of the axial widths of the radial exterior faces of the two lateral rolling discs whereby an axially compact easily balanceable bearing system is provided.

13. A bearing system for a wave generator, the bearing system having at least two rolling discs arranged axially side by side, an eccentric ring associated with each rolling disc, means for selectively frictionally coupling the eccentric rings, bearing means interconnecting each rolling disc and its associated eccentric ring, means for radially adjusting one eccentric ring relative to at least one other eccentric ring when the means selectively frictionally coupling the eccentric rings is released and a flexible ring, each rolling disc having a radially exterior face, the exterior faces of the rolling discs applying deformation forces against the flexible ring, means for preventing relative axial movement between the flexible ring and the rolling discs, the preventing means comprising axially spaced retention means projecting radially between the rolling discs and the flexible ring, a central rolling disc, the two rolling discs being positioned laterally of the central rolling disc, means for concentrically mounting the eccentric rings interconnected to the lateral rolling discs, the mounting means comprising a cylindrical sleeve, each of the lateral eccentric rings including an annular shoulder, the sleeve being seated in one of the annular shoulders at each of its ends, a central eccentric ring associated with the central rolling disc and bearing means interconnecting the central rolling disc and the central eccentric ring, the central rolling disc being clamped between the eccentric rings associated with the lateral rolling discs by the means frictionally coupling the eccentric rings, further including bearing means interconnecting the central rolling disc with its associated eccentric ring, the bearing means associated with the central rolling disc having a load capacity substantially the sum of the load capacities of the bearing means interconnecting the two lateral rolling discs with their associated eccentric rings.

14. A bearing system for a wave generator as constructed in accordance with claim 13 wherein the means for radially adjusting the eccentric rings comprises an adjustment screw, the adjustment screw being threadingly engaged in the sleeve, the adjustment screw being in engagement with the eccentric ring associated with the central rolling disc.

15. A bearing system for a wave generator, the bearing system having at least two rolling discs arranged axially side by side, an eccentric ring associated with each rolling disc, means for selectively frictionally coupling the eccentric rings, bearing means interconnecting each rolling disc and its associated eccentric ring, means for radially adjusting one eccentric ring relative to at least one other eccentric ring when the means selectively frictionally coupling the eccentric rings is released and a flexible ring formed of other than hardened material, each rolling disc having a radially exterior face, the exterior faces of the rolling discs applying deformation forces against the flexible ring, the system further including a precision steel strip, the steel strip being positioned between the flexible ring and the exterior faces of the rolling discs, means for preventing relative axial movement between the flexible ring and the rolling discs, the preventing means comprising axially spaced retention means projecting radially between the rolling discs and the flexible ring.

16. A bearing system for a wave generator, the bearing system having at least two rolling discs arranged axially side by side, an eccentric ring associated with each rolling disc, means for selectively frictionally coupling the eccentric rings, bearing means interconnecting each rolling disc and its associated eccentric ring, means for radially adjusting one eccentric ring relative to at least one other eccentric ring when the means selectively frictionally coupling the eccentric rings is released and a flexible ring, each rolling disc having a radially exterior face, the exterior faces of the rolling discs applying deformation forces against the flexible ring, means for preventing relative axial movement between the flexible ring and the rolling discs, the preventing means comprising axially spaced retention means projecting radially between the rolling discs and the flexible ring, a drive shaft, means coupling the drive shaft through the eccentric rings, the drive shaft including a perpendicular flange, the coupling means including means frictionally coupling the flange to the eccentric rings.

17. A bearing system for a wave generator as constructed in accordance with claim 16 wherein the flange is positioned between the eccentric rings.

* * * * *